(12) United States Patent
Ohno

(10) Patent No.: US 8,169,631 B2
(45) Date of Patent: May 1, 2012

(54) PRINTING APPARATUS, INFORMATION PROCESSING APPARATUS, CONTROL METHOD THEREOF, PRINT MANAGEMENT SYSTEM, AND PROGRAM

(75) Inventor: Hajime Ohno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1167 days.

(21) Appl. No.: 11/680,628

(22) Filed: Mar. 1, 2007

(65) Prior Publication Data

US 2007/0206212 A1 Sep. 6, 2007

(30) Foreign Application Priority Data

Mar. 2, 2006 (JP) .................................. 2006-056940

(51) Int. Cl.
*G06K 15/00* (2006.01)
(52) U.S. Cl. ...................... 358/1.14; 358/1.13; 358/1.15; 726/24; 726/34; 726/181
(58) Field of Classification Search .................. None
See application file for complete search history.

(56) References Cited

U.S. PATENT DOCUMENTS

| | | | |
|---|---|---|---|
| 5,907,835 A | 5/1999 | Yokomizo et al. | |
| 5,978,477 A | 11/1999 | Hull et al. | |
| 6,199,073 B1 | 3/2001 | Peairs et al. | |
| 6,957,235 B2 | 10/2005 | Peairs et al. | |
| 7,383,580 B1 * | 6/2008 | Frentz | 726/24 |
| 2005/0160117 A1 * | 7/2005 | Oho et al. | 707/204 |
| 2005/0193200 A1 * | 9/2005 | Akiba et al. | 713/168 |
| 2006/0170964 A1 * | 8/2006 | Matsuda | 358/1.15 |
| 2007/0044160 A1 * | 2/2007 | Ishibashi | 726/34 |

FOREIGN PATENT DOCUMENTS

| | | | |
|---|---|---|---|
| JP | 08-147446 A | | 6/1996 |
| JP | 2002-149371 A | | 5/2002 |
| JP | 2002-229747 | * | 8/2002 |
| JP | 2002-229747 A | | 8/2002 |
| JP | 2003-182189 | * | 7/2003 |
| JP | 2003-182189 A | | 7/2003 |
| JP | 2003-330677 A | | 11/2003 |
| JP | 2004-118243 A | | 4/2004 |

* cited by examiner

*Primary Examiner* — Benny Tieu
*Assistant Examiner* — Pawandeep Dhingra
(74) *Attorney, Agent, or Firm* — Canon USA, Inc., I.P. Division

(57) ABSTRACT

An apparatus and method for printing data based on an electronic file and generating management information about the print data including receiving print data and identification information associated with the electronic file, comparing the received print data with registered print data registered in a management apparatus based on the identification information, and registering the management information.

8 Claims, 13 Drawing Sheets

WHEN PAGE SPECIFIC HASH VALUES ARE COMPLETELY INCLUDED

REGISTERED

| PAGE NUMBER | HASH VALUE |
|---|---|
| 1 | F3C1 |
| 2 | C6AA |
| 3 | D3BE |
| 4 | 7B3F |
| 5 | 5248 |

NEWLY REGISTER

| PAGE NUMBER | HASH VALUE |
|---|---|
| 1 | F3C1 |
| 2 | D3BE |

WHEN PAGE SPECIFIC HASH VALUES ARE NOT COMPLETELY INCLUDED

REGISTERED

| PAGE NUMBER | HASH VALUE |
|---|---|
| 1 | F3C1 |
| 2 | C6AA |
| 3 | D3BE |
| 4 | 7B3F |
| 5 | 5248 |

NEWLY REGISTER

| PAGE NUMBER | HASH VALUE |
|---|---|
| 1 | F3C1 |
| 2 | B3BE |
| 3 | 088D |

WHEN PAGE SPECIFIC HASH VALUES ARE COMPLETELY INCLUDED

| REGISTERED | |
|---|---|
| PAGE NUMBER | HASH VALUE |
| 1 | F3C1 |
| 2 | C6AA |
| 3 | D3BE |
| 4 | 7B3F |
| 5 | 5248 |

| NEWLY REGISTER | |
|---|---|
| PAGE NUMBER | HASH VALUE |
| 1 | F3C1 |
| 2 | D3BE |

WHEN PAGE SPECIFIC HASH VALUES ARE NOT COMPLETELY INCLUDED

| REGISTERED | |
|---|---|
| PAGE NUMBER | HASH VALUE |
| 1 | F3C1 |
| 2 | C6AA |
| 3 | D3BE |
| 4 | 7B3F |
| 5 | 5248 |

| NEWLY REGISTER | |
|---|---|
| PAGE NUMBER | HASH VALUE |
| 1 | F3C1 |
| 2 | B3BE |
| 3 | 088D |

PRINTING APPARATUS, INFORMATION PROCESSING APPARATUS, CONTROL METHOD THEREOF, PRINT MANAGEMENT SYSTEM, AND PROGRAM

BACKGROUND OF THE INVENTION

1. Field of the Invention

The present invention relates to a print management system formed by connecting an information processing apparatus that generates print data to a printing apparatus that receives the print data, a printing apparatus and information processing apparatus and a control method thereof, and a program.

2. Description of the Related Art

There exists a system which stores print data and print log information (e.g., user name) in association and manages them in order to track printed confidential information (Japanese Patent Laid-Open No. 08-147446). Upon detection of disclosure of confidential information, this system searches for print data similar to the disclosed words or image and browses print log information about print data with high similarity. This system is called a Job Archive System and will be abbreviated as a JA hereinafter.

This system includes a JA client unit (JA Agent) that runs on a printer and a JA server unit that runs on a normal PC or a server computer. The JA client unit and JA server unit are connected via a network.

The JA client unit intercepts print data, which the client PC has requested of the printer, before actual printing on paper and transmits the data and print log information to the JA server unit. The JA server unit segments the print data into pages and then segments each page into text regions and image regions, thereby generating search data of each region. The JA server unit integrates the print data of one page, text region information, image region information, text region search data, and image region search data in association to generate storage data of each page. The JA server unit also integrates the original print data and the storage data of each page in association to generate storage data of each print data and saves it in the storage device.

Nationwide or worldwide enterprises have several tens to several thousands of bases, including branch offices and business offices, where each worker holds his/her own PC, and one printer is installed for several to several tens of workers. There are market needs for such enterprises to prevent disclosure of confidential information by introducing a JA and storing print data from individual PCs to a base printer in a set of JA servers installed in the headquarters or head office. Print data to be stored in the JA server is estimated to be several hundred GB/day (=several thousand persons×several ten pages/day/person×several hundred KB/page).

Typical storage devices are usually not equipped to store such an enormous quantity of data. Usually, it is necessary to purchase a storage device capable of distributing storage modules by using a network function. However, such a device is very expensive.

In a multiple copy print mode, some software applications transmit identical print data in a number as large as the designated number of copies, and make the JA server store the same data multiple times. Storing the same data multiple times unnecessarily uses up storage space, and thus, is an inefficient manner in which to store data.

One method of solving the storage problem would be to install a base server on each base. This however, would be not be cost effective. Additionally, since the JA server unit is put under heavy load upon receiving and storing data, it is necessary to minimize new processes.

SUMMARY OF THE INVENTION

The present invention addresses the above-described problem by providing a technique for reducing the management cost of print data managed for tracking.

According to one aspect of the present invention, a printing apparatus which prints print data generated based on an electronic file and generates management information about the print data, includes a reception unit configured to receive the print data and identification information of the electronic file associated with the print data, a comparison unit configured to compare, based on the identification information, the received print data with registered print data registered in a management apparatus, a generation unit configured to generate the management information based on a comparison result by the comparison unit, and a registration unit configured to register, in the management apparatus, the management information, wherein the generation unit generates partial information representing that the received print data is part of the registered print data if comparison by the comparison unit reveals that the identification information is registered in the management apparatus, and part of the registered print data associated with the registered identification information completely includes the received print data.

According to another aspect of the present invention, a printing apparatus which prints print data generated based on an electronic file and generates management information about the print data, includes a reception unit configured to receive the print data and identification information of the electronic file associated with the print data, a comparison unit configured to compare, based on the identification information, the received print data with registered print data registered in a management apparatus, a generation unit configured to generate the management information based on a comparison result by the comparison unit, and a registration unit configured to register, in the management apparatus, the management information, wherein the generation unit generates difference print data between the registered print data and the received print data, and the registration unit deletes the registered print data if comparison by the comparison unit reveals that the identification information is registered in the management apparatus, and part of the registered print data associated with the registered identification information does not completely include the received print data.

According to still another aspect of the present invention, an information processing apparatus which generates print data to be output to a printing apparatus, includes a generation unit configured to generate print data based on a designated electronic file, a conversion unit configured to convert the print data based on a print data conversion command, a prohibition unit configured to prohibit, based on attribute information of the electronic file, the conversion by the conversion unit for the print data, and a transmission unit configured to transmit, to the printing apparatus, the print data and the print data conversion command associated with the print data if the conversion by the conversion unit for the print data is prohibited by the prohibition unit.

Further features of the present invention will become apparent from the following description of exemplary embodiments with reference to the attached drawings.

DESCRIPTION OF THE EMBODIMENTS

Various exemplary embodiments, features, and aspects of the present invention will be described in detail below with reference to the drawings.

First Embodiment

To solve the problem of storage capacity reduction while meeting the market's requirements to reduce the operation cost as described above, one solution is to add, on a printer, new processing, and more particularly, small processing that can be implemented by an embedded Java® platform installed in the printer.

In the first embodiment, a "JA Agent" that receives a print request on a printer determines the necessity of print data storage so as to store the data indispensable to print data search. This reduces the storage data size per print job.

More specifically, when a file is printed a plurality of times, it is unnecessary to store the same print data more than once.

To determine whether a target file is printed more than once, a unique object identification number added to each file in an NTFS (NT File System) file system from Windows® 2000 is used. This object identification number is called an Object Identifier and will be abbreviated as an OID hereinafter.

The OID functioning as file identification information does not change even when the file name is changed or moves in a local HDD or between PCs or servers belonging to the same domain. The OID does not change even when the file contents change. For this reason, multiple print data, generated upon printing one file with a predetermined OID at different timings, have a high probability of being identical. Even when the file has changed, the difference between the two print data is small.

An arrangement for determining a file identity by an OID and saving the storage capacity necessary for file management will now be described.

Figure 1A:
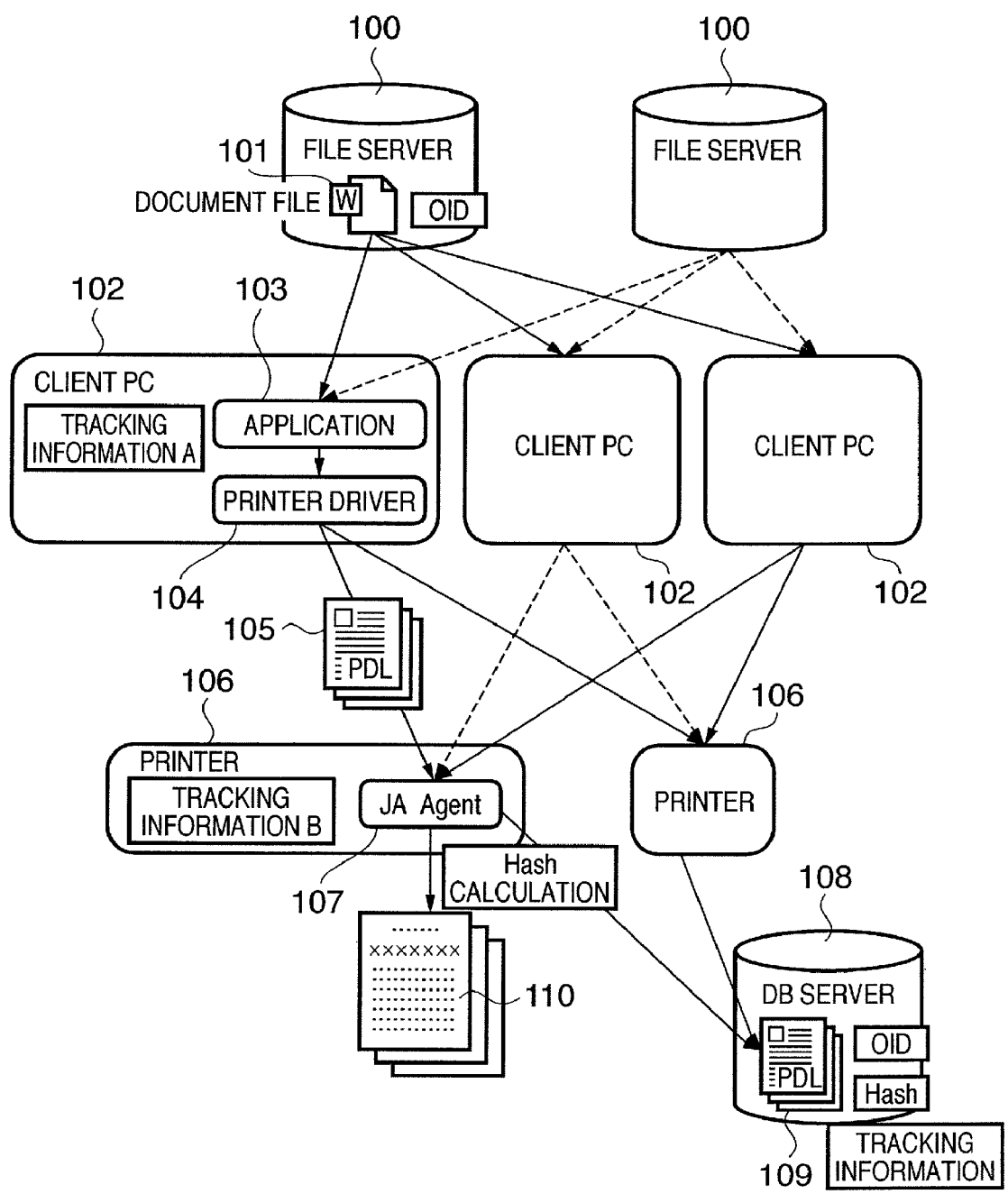
FIG. 1A is a view illustrating the configuration of a print management system according to the first embodiment of the present invention.

FIG. 1A is a view illustrating the configuration of a print management system according to the first embodiment of the present invention.

In the example illustrated in FIG. 1A, the print management system is formed by connecting a plurality of file servers, a plurality of client PCs, a plurality of printers, and a database (DB) server to each other via a network. Implementation of the present invention is not limited to this configuration, and any configuration that would enable practice of the present invention is applicable.

Each file server 100 has a function of associating an OID with each file. The file server 100 is presumed to open, as a shared folder, an HDD formatted by, e.g., NTFS v5, i.e., the file system of Microsoft Windows® 2000. An electronic document file 101 is saved on the file server 100 in association with an OID provided by the file server 100.

Reference numeral 102 denotes a client PC. The client PCs 102 and file servers 100 belong to the same domain. The system maintains an OID in moving a file between computers belonging to the same domain. Thus, it is easier to identify an original file even when a plurality of persons share a file server area and work together using one file.

An application 103 running on the client PC 102 can open, edit, display, and print the electronic document file 101. Reference numeral 104 denotes a printer driver. The printer driver 104 generates print data 105 by translating a general-purpose rendering command into a rendering command unique to the printer 106 based on a print request from the application 103. The print data 105 contains, for example, data of a plurality of pages, and typically has a quantity of several hundred KB to several MB for A4 printing.

Reference numeral 106 denotes a printer or multi-function peripheral (MFP). The printer 106 incorporates an embedded Java® virtual machine (JVM), and can therefore execute a small-scale application created by Java®. A Java® application (JVA) created by the JVM. In addition, JA Agent 107 realizes a part of a function of Job Archive System (JA) using JAVA Application (JVA). The JA Agent 107 transmits print data and its tracking information to a database (DB) server 108 functioning as a JA server.

The DB server 108 processes print data received from the JA Agent 107 to facilitate searching of print data. The database stores print data, search data, and print log information (tracking information) together as management information (basic data) 109. Reference numeral 110 denotes an actual printed product obtained by the printer 106.

As described above, the print management system illustrated in FIG. 1A is formed by connecting the printers 106 and client PCs 102 via a predetermined network (e.g., LAN). In the present embodiment, print data (e.g., various kinds of page description language (PDL) data such as PDF/PS) generated by the client PCs 102 can be output via the network to the printers 106 and printed.

The printers 106 and client PCs 102 need not always connect to each other via a network. They may connect directly via a predetermined interface (e.g., USB interface).

The arrangement of an MFP serving as the printer 106 will be described next with reference to FIG. 1B.

The MFP incorporates a storage device, such as a hard disk, capable of storing a plurality of jobs. The MFP also has a copy function which creates a job output from a scanner unit to be printed by a printer unit via the storage device. The MFP also has a print function which creates a job output from data provided by an external device, such as a PC, to be printed by a printer unit via the storage device.

The MFP includes a full-color device and a monochrome device. Except for the color processing function and internal data, the full-color device includes the same parts arrangement as the monochrome device. Hence, only the full-color device will be described herein, and an explanation of the monochrome device will be added as needed.

The system described with respect to the first embodiment may include only one or both of a composite function type image forming apparatus (printing apparatus) having a plurality of functions and a single function peripheral (SFP) as a single function type image forming apparatus (printing apparatus) having only the print function. The system may include a plurality of image forming apparatuses of any one of the types.

Figure 1B:
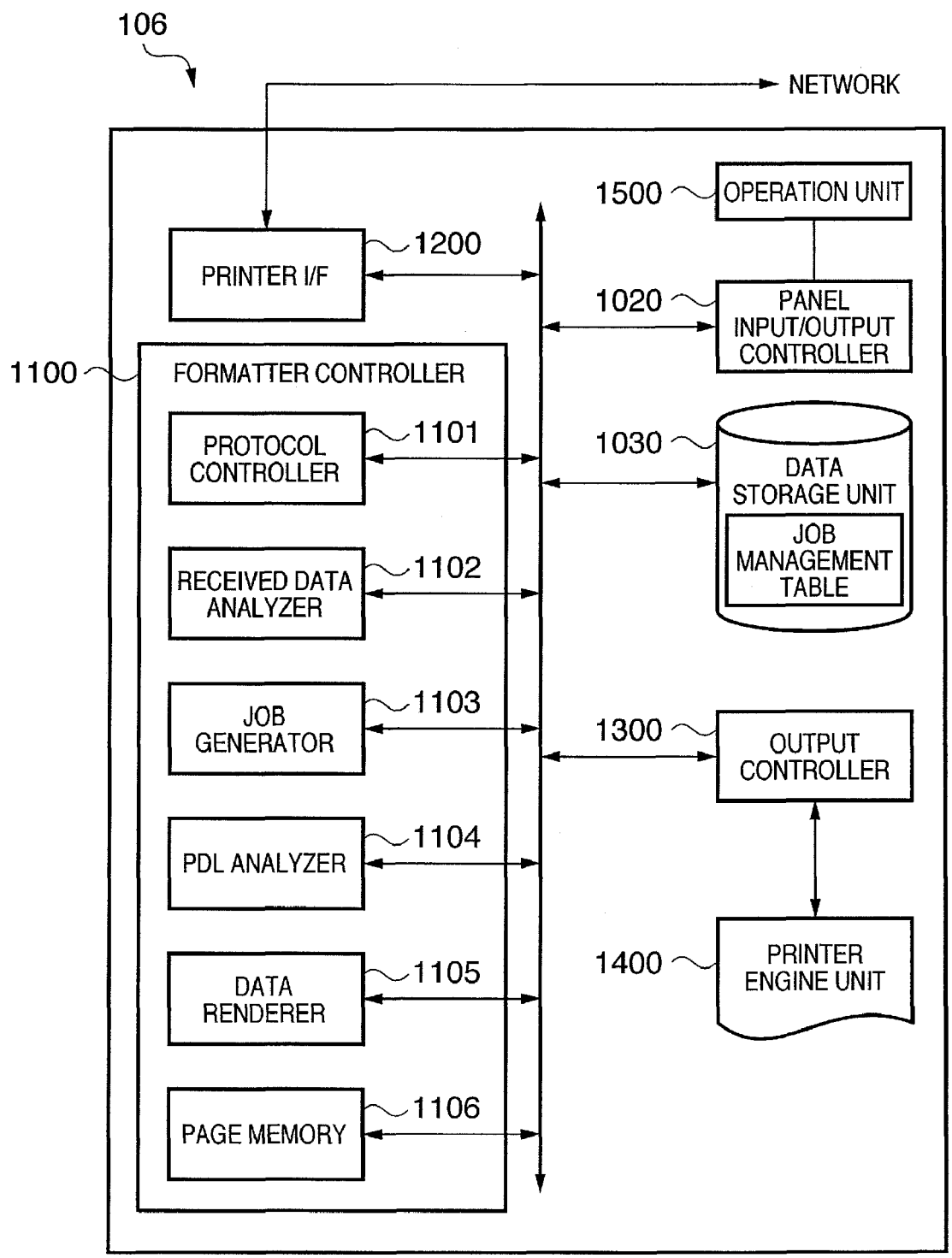
FIG. 1B is a block diagram illustrating the internal arrangement of a printer according to the first embodiment of the present invention.

FIG. 1B is a block diagram illustrating the internal arrangement of the printer 106 according to the present embodiment.

Referring to FIG. 1B, the printer 106 includes a formatter controller 1100, panel input/output controller 1020, data storage unit 1030, printer interface (I/F) 1200, output controller 1300, and printer engine unit 1400.

The printer I/F 1200 controls input/output from/to an external device. The formatter controller 1100 includes a protocol controller 1101, received data analyzer 1102, JOB generator 1103, PDL analyzer 1104, data renderer 1105, and page memory 1106.

In general, the formatter controller 1100 is formed from a computer system including a CPU, ROM, and RAM. The ROM in the formatter controller 1100 stores programs to implement various applications including the JA Agent 107 in FIG. 1A. The CPU reads out each program to implement its functions.

The protocol controller 1101 communicates with an external device by analyzing and transmitting a network protocol. The received data analyzer 1102 analyzes received data from the client PC 102 and recognizes print setting information set in the data and process contents corresponding to the setting information.

The received data analyzer 1102 executes processes (FIGS. 2A and 2B), described below, for the received data and transmits necessary data to the DB server 108 as needed.

The received data from the client PC 102 contains print data with additional tracking information. The tracking information is generated by the printer driver 104 on the client PC 102 and added to the print data.

The JOB generator 1103 generates a JOB (print job) corresponding to the received data of the process target. The data storage unit 1030 temporarily stores the generated JOB. The panel input/output controller 1020 outputs a job status operation window to an operation unit 1500 of the printer 106.

The PDL analyzer 1104 analyzes PDL data based on the JOB stored in the data storage unit 1030 and converts the data into intermediate data with a format which is easier to process. The intermediate data generated by the PDL analyzer 1104 is transferred to the data renderer 1105 and processed. The data renderer 1105 bitmaps the intermediate data and sequentially renders the bitmap data on the page memory 1106.

The panel input/output controller 1020 controls input/output from the operation unit 1500 of the printer 106. The data storage unit 1030 stores received data and intermediate data for PDL print and is implemented by a secondary storage device such as a hard disk. The data storage unit 1030 also stores various kinds of data, jobs to be printed, and printed jobs.

The output controller 1300 converts the contents in the page memory 1106 into an image signal and transfers it to the printer engine unit 1400. The printer engine unit 1400 is a print mechanism unit which forms, on a recording medium, a permanent visible image based on the received image signal.

The arrangement of the file server 100, client PC 102, and DB server 108 implemented by an information processing apparatus such as a computer will be described next with reference to FIG. 1C.

Figure 1C:
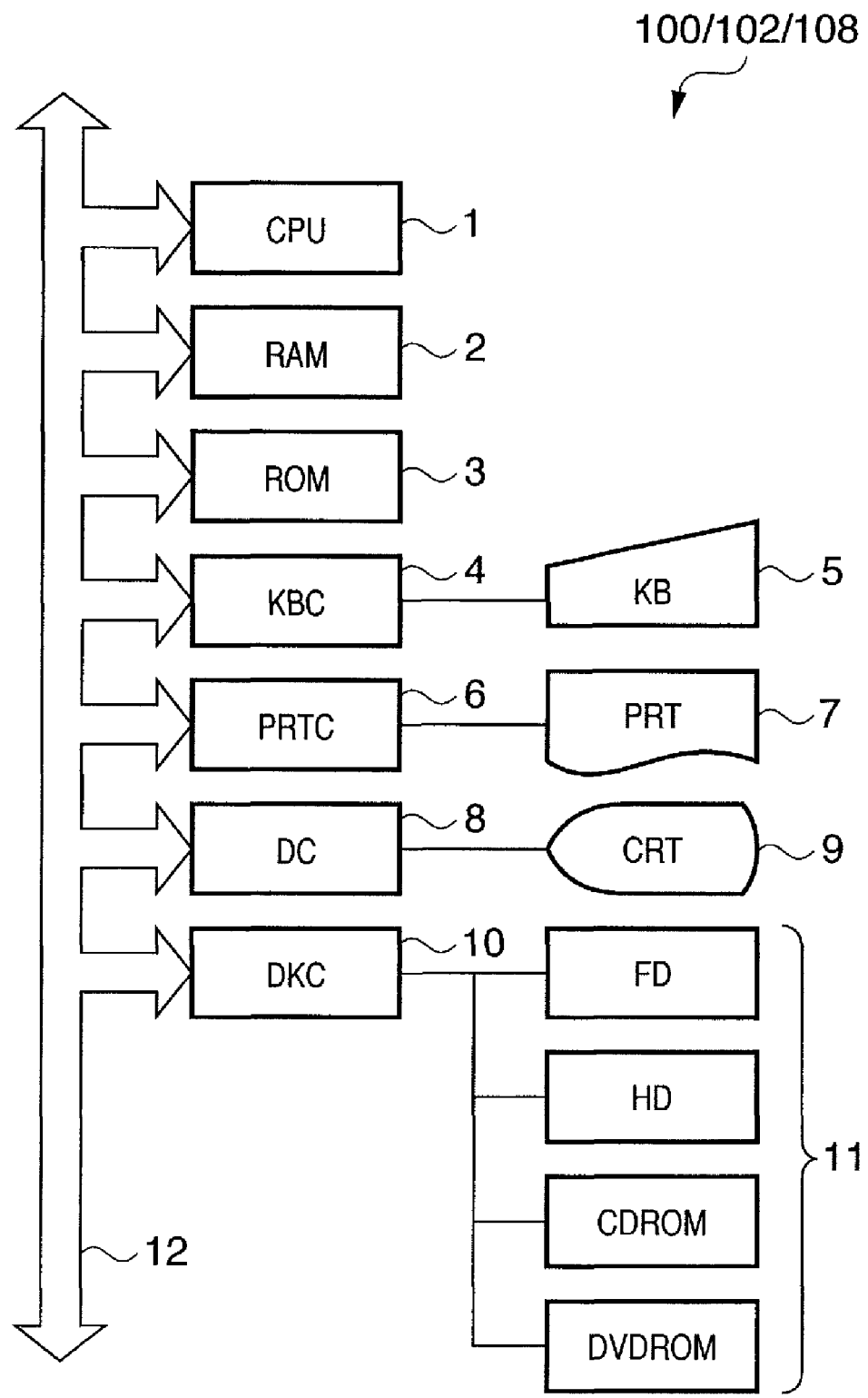
FIG. 1C is a block diagram illustrating the arrangement of an information processing apparatus according to the first embodiment of the present invention.

FIG. 1C is a block diagram illustrating the arrangement of an information processing apparatus according to the first embodiment of the present invention.

Referring to FIG. 1C, a CPU 1 controls the entire information processing apparatus and executes arithmetic processes. A RAM 2 serves as an area to load programs and data for processes and to execute the programs. A ROM 3 serves as a storage area of a system control program and font data.

A keyboard controller (KBC) 4 receives data by key input from a keyboard (KB) 5 and transmits the data to the CPU 1. A printer controller (PRTC) 6 controls a printer (PRT) 7. The PRT 7 is, for example, an MFP, laser beam printer, or inkjet printer.

A display controller (DC) 8 controls display on a display device (CRT) 9. A disk controller (DKC) 10 controls, among other things, data transmission.

An external storage device 11 includes a floppy disk (FD), hard disk (HD), CDROM, and DVDROM. The external storage device 11 stores data and various kinds of programs such as applications and printer drivers and refers to them or loads them to the RAM 2 as needed. A system bus 12 serves as a data transfer path between the above-described elements.

The external storage device 11 stores a printer driver for displaying a print setting window to execute control over printing by the printer 106 and input various print settings for print data to be output to the printer 106.

The information processing apparatus operates by causing the CPU 1 to execute a basic I/O (input/output) program and an operating system (OS).

The basic I/O program is stored in the ROM 3 while the OS is written in the external storage device 11. Upon power-on of the client PC 102, the OS is loaded from the external storage device 11 to the RAM 2 by an Initial Program Loading (IPL) function in the basic I/O program and starts the operation.

Figure 2A:
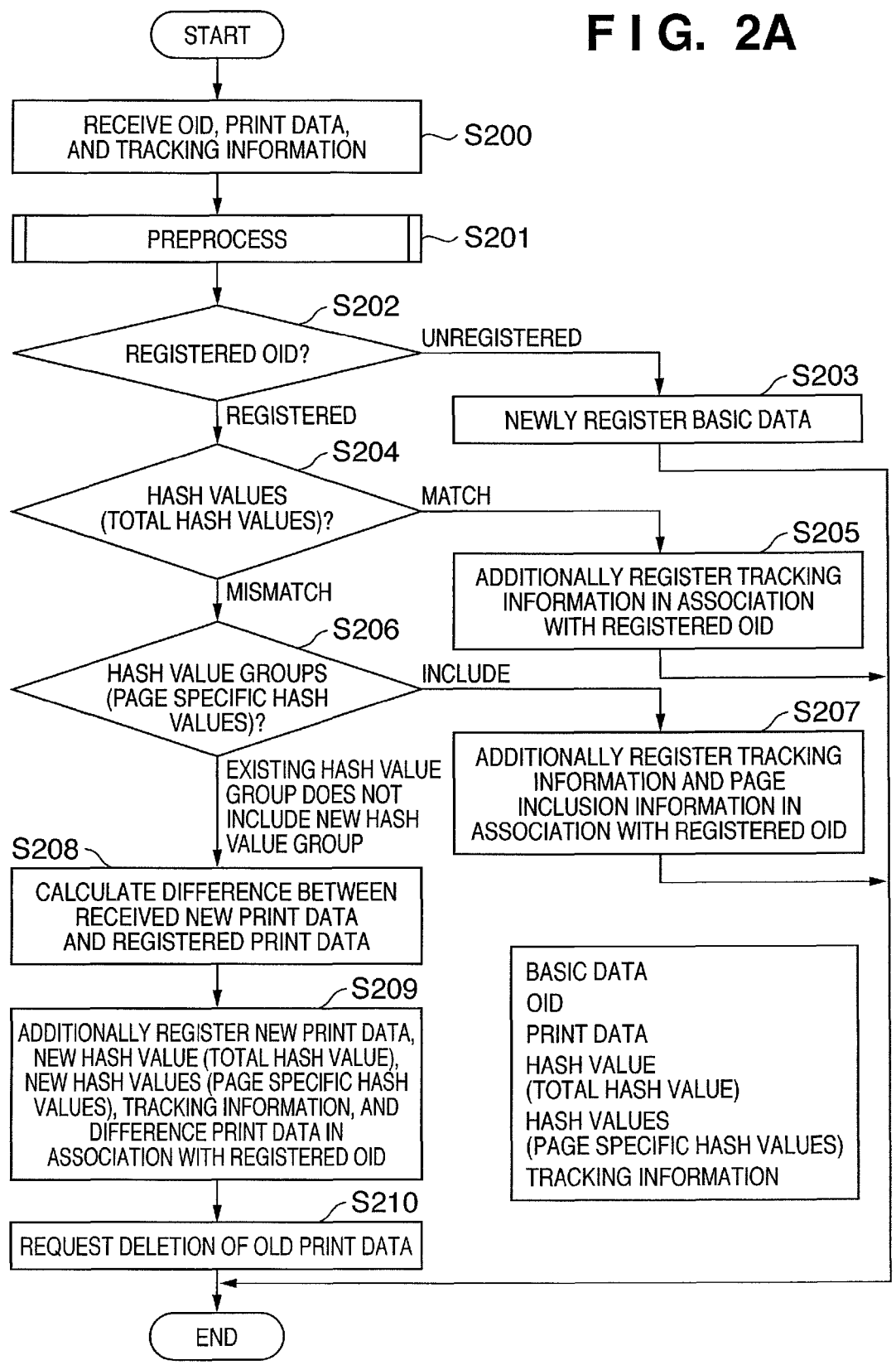
FIG. 2A is a flowchart illustrating a process executed by a JA Agent according to the first embodiment of the present invention.
Figure 2B:
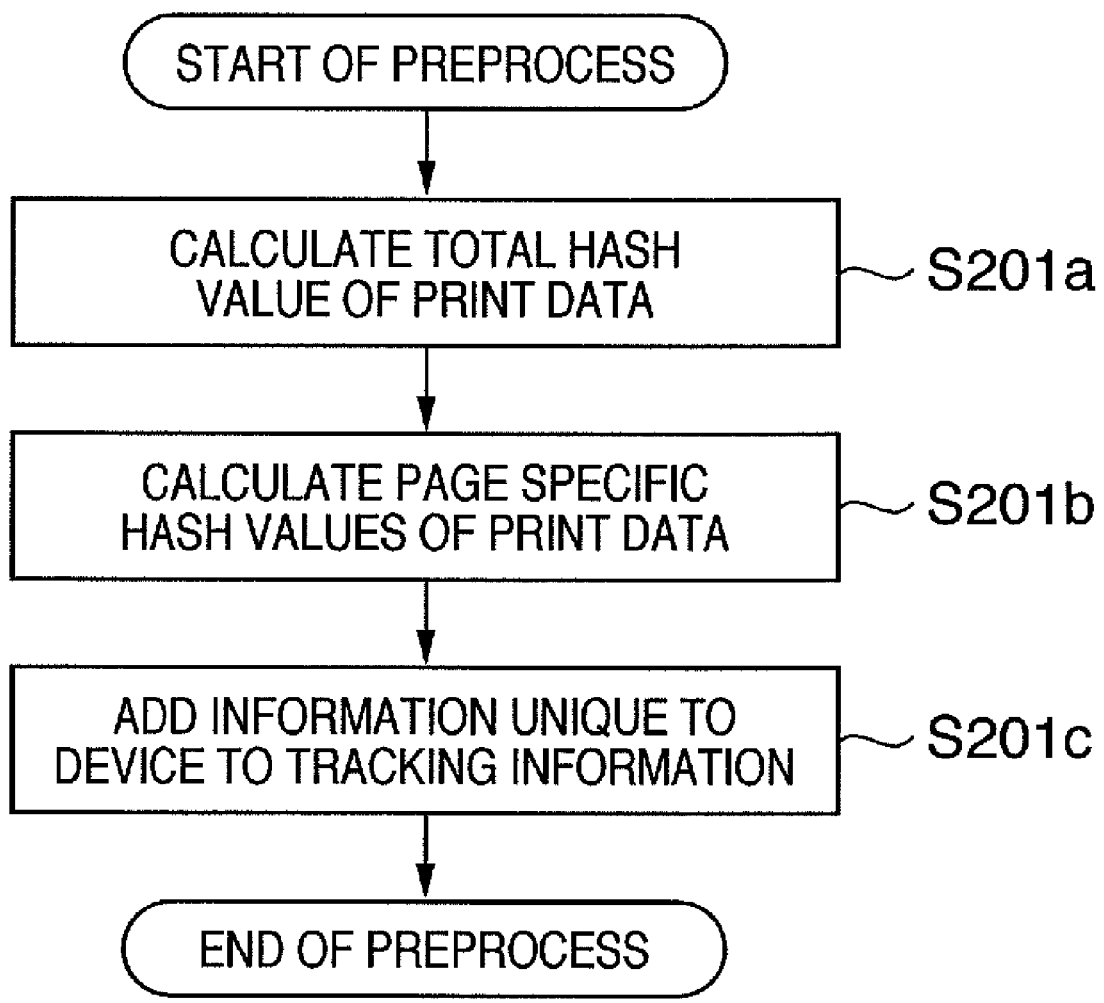
FIG. 2B is a flowchart illustrating a process executed by the JA Agent according to the first embodiment of the present invention.

FIGS. 2A and 2B are flowcharts illustrating a process executed by the JVA Agent according to the first embodiment of the present invention.

In step S200, the JA Agent receives print data containing the OID of a document file and the tracking information of the print data from the printer driver 104 of the client PC 102.

In step S201, the JA Agent executes a preprocess of the received data. The preprocess is described in detail with reference to FIG. 2B. In step S201a, the JA Agent calculates the total hash value of the print data. In step S201b, the JA Agent calculates the page-specific hash values of the print data. In step S201c, the JA Agent adds information unique to the device to the tracking information.

The tracking information may contain, for example, print log information (e.g., user name, application name, date, and device name) about the print data. In the present embodiment, a hash value (data verification value) is calculated by using a hash function. However, the present invention is not limited to this, and any data verification function that would enable practice of the present invention is applicable.

Returning to FIG. 2A, in step S202, the JA Agent determines whether the received OID is already registered. More specifically, the JA Agent checks the DB server 108 with respect to whether the received OID is already registered in the database.

If the OID is not registered yet, then in step S203, the JA Agent calculates the total and page-specific hash values of the received print data and generates an OID, print data, hash values (total hash value), hash values (page-specific hash values), and tracking information. Information that associates them with each other is registered in the database of the DB server 108 as basic data, and the process is completed (Case 1: first registration).

If the received OID is already registered, then in step S204, the JA Agent compares the total hash value of the received print data with the total hash value of the registered print data.

If the total hash values match, flow proceeds to step S205, where only the tracking information is additionally registered in the database of the DB server 108 in association with the registered OID, and the process is completed (Case II: perfect match).

If the total hash values do not match, the JA Agent compares the page-specific hash values of the received print data with the page-specific hash values of the registered print data in step S206. This comparison is done to check whether the page-specific hash value set of the registered print data completely includes the page-specific hash value group of the received print data. If the page-specific hash value set of the registered print data completely includes the page-specific hash value group of the received print data, the received print data indicates partial printing of the registered print data.

If the page-specific hash value set of the registered print data completely includes the page-specific hash value group of the received print data, then in step S207, the page inclusion information and tracking information are additionally registered in the database of the DB server 108 in association with the registered OID, and the process is completed (Case III: partial printing).

If the page-specific hash value set of the registered print data does not completely include the page-specific hash value group of the received print data, in step S208, the JA Agent calculates the difference between the received print data (new print data) and the registered print data (old print data).

In step S209, the new print data, hash value (total hash value), hash values (page-specific hash values), tracking information, and difference print data to reconstruct the old print data from the new print data are registered in the database of the DB server 108 in association with the registered OID.

In step S210, the JA Agent deletes the old print data by deleting appropriate old print data from the database server 108. Alternatively, the DB server 108 can delete the old print data itself. Upon completion of the deletion, the process is completed (Case IV: updated document printing).

In the process illustrated in FIG. 2A, the JA Agent 107 registers target data in the database of the DB server 108. Alternatively, the DB server 108 registers the data itself.

Figure 3:
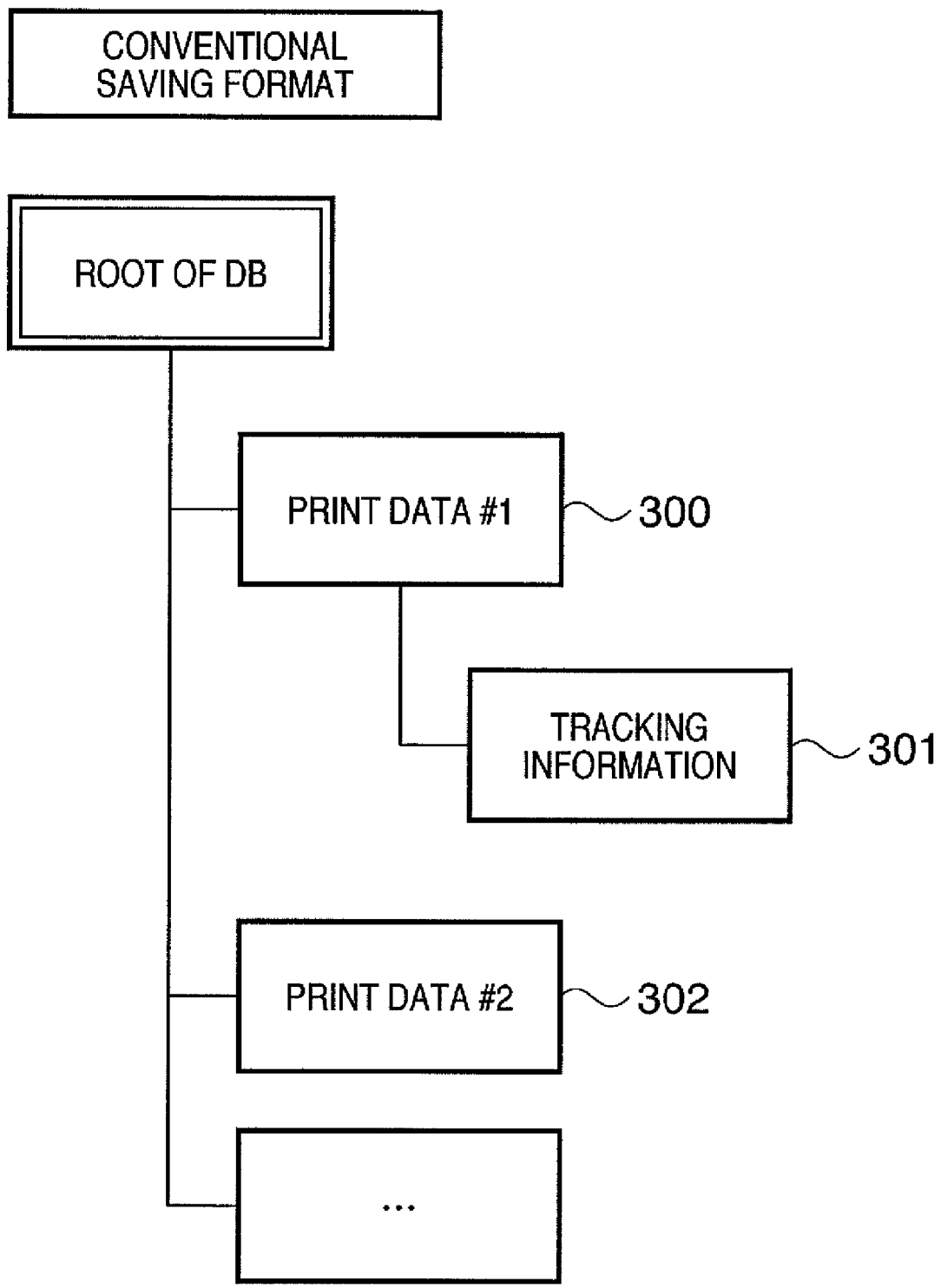
FIG. 3 is a view illustrating an example of a conventional data saving format.

FIG. 3 is a view illustrating an example of a conventional data saving format. Reference numeral 300 denotes one set of print data transmitted from the client PC 102. Tracking information 301 is transmitted together with the print data 300 and saved in association with the print data 300. Another set of print data 302 is stored immediately after the print data 300. As illustrated, the conventional method saves each print data and its tracking information in association with each other. The print data are saved in the order in which they are received, and any other relationship between them is typically not taken into consideration. For this reason, a storage capacity to store all print data is necessary.

The data saving formats on the DB server 108 as used in present embodiment will now be described.

Figure 4:
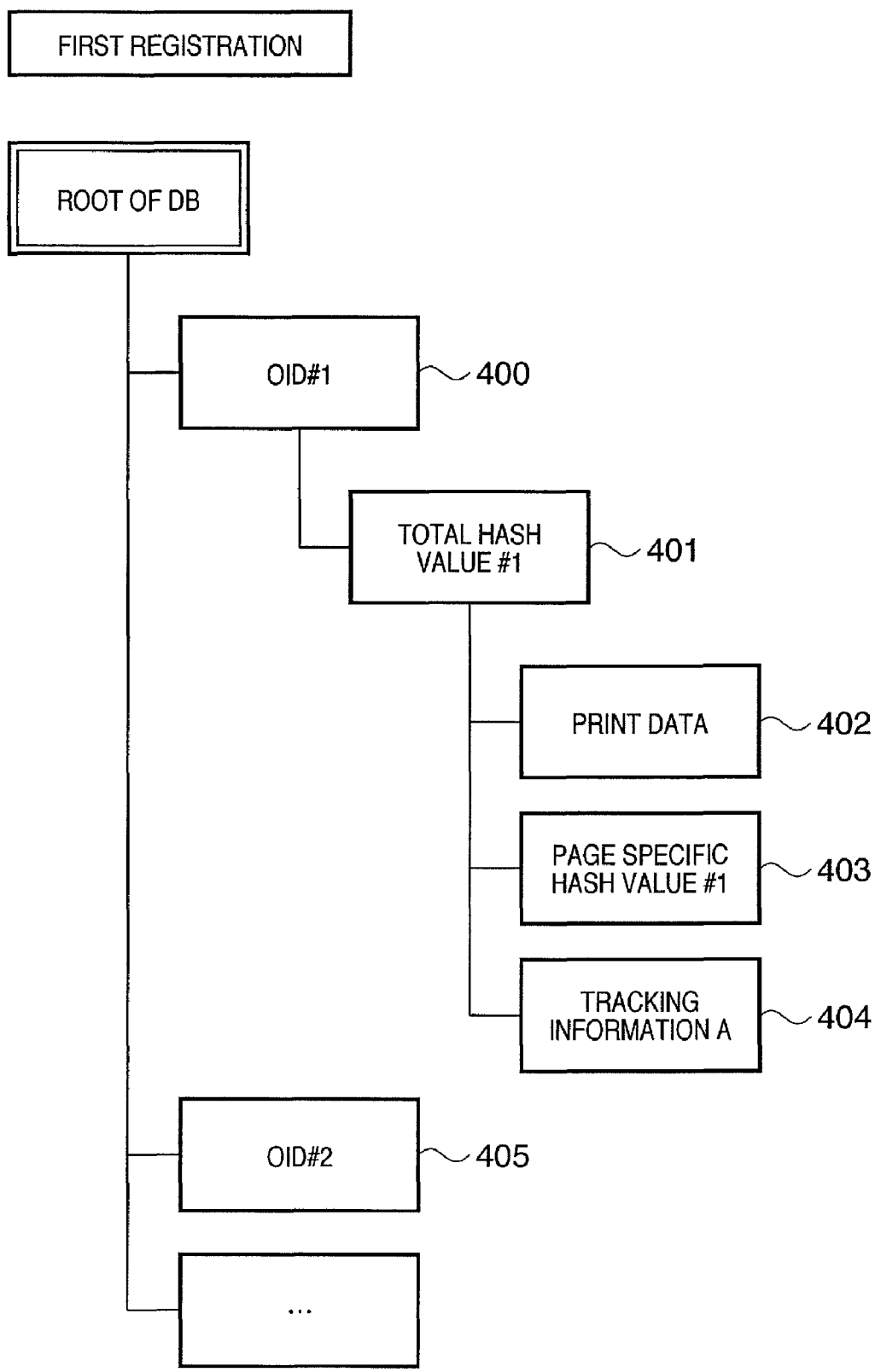
FIG. 4 is a view illustrating a data saving format according to the first embodiment of the present invention.

FIG. 4 illustrates a data saving format in Case I: first registration. Reference numeral 400 denotes an OID of an electronic document file corresponding to one set of print data transmitted from the client PC 102. A total hash value 401 of the print data is stored in association with the OID#1 400. The one set of print data 402 transmitted from the client PC 102 is stored in association with the total hash value #1 401. A page-specific hash value group #1 403 of the print data 402 is stored in association with the total hash value #1 401.

Tracking information A 404 transmitted from the printer 106 together with the print data 402 is saved in association with the total hash value #1 401. OID#2 405, which is different from the OID#1 400, is received by the DB server 108 next to the OID#1 400. Although not illustrated, the OID#2 405 has the same structure as the OID#1 400.

Figure 5:
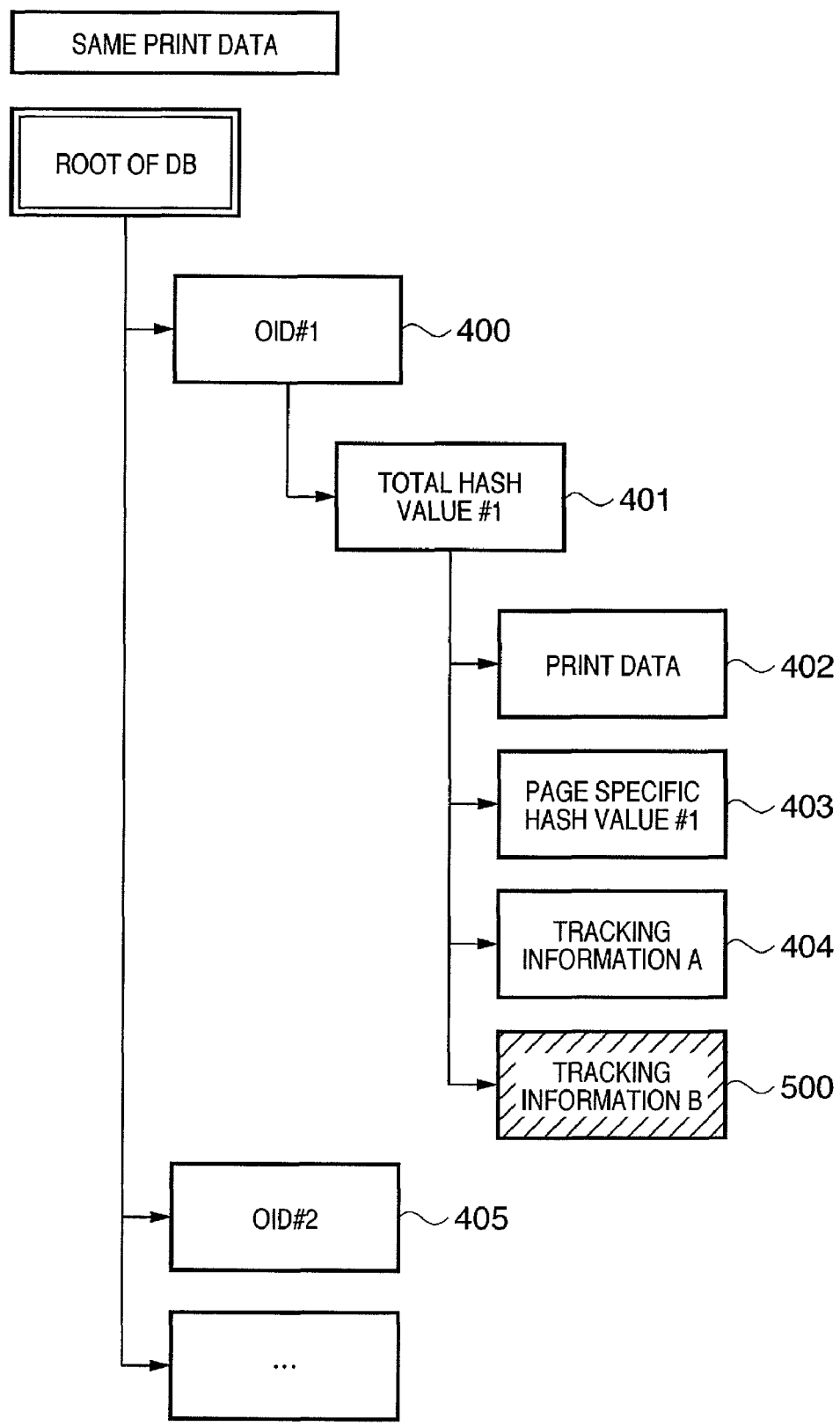
FIG. 5 is a view illustrating a data saving format according to the first embodiment of the present invention.

FIG. 5 illustrates a data saving format in Case II: perfect match. The format depicted in FIG. 5 corresponds to reprinting of an electronic document file located on the file server 100 or the local HDD of the client PC 102, which has been printed in the past and is not modified from then. The structure of the format in FIG. 5 is essentially the same as that in FIG. 4, and as such, only a description of the difference is provided herein.

The structure of the format in FIG. 5 is different from the structure in FIG. 4 in that tracking information B 500 is added to the total hash value 401. In this case, the print data has a registered OID and the same total hash value. Hence, tracking information is added in association with the total hash value, and no other additional data exists.

Case II applies not only to reprinting, but also to printing by an application that has print logic to transmit print data in a number as large as the designated number of copies in a multiple copy print. Even in this case, it is possible to effectively save storage space.

Figure 6:
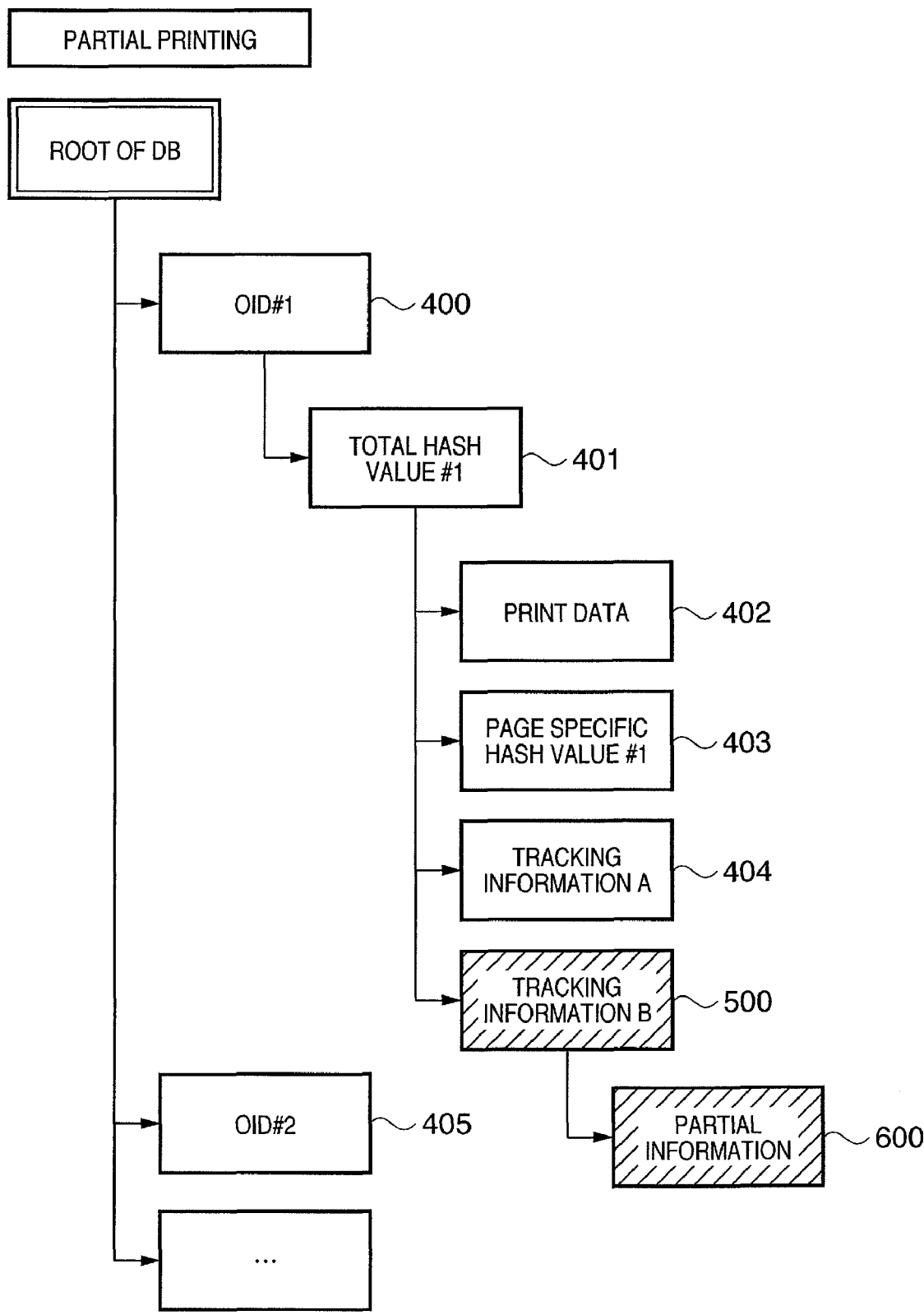
FIG. 6 is a view illustrating a data saving format according to the first embodiment of the present invention.

FIG. 6 illustrates a data saving format in Case III: partial printing. The format depicted in FIG. 6 corresponds to partial reprinting of an electronic document file located on the file server 100 or the local HDD of the client PC 102, which has been printed in the past and is not modified from then. Alternatively, it corresponds to reprinting of only an unmodified part of a partially modified electronic document file. The structure of the format in FIG. 5 is essentially the same as that in FIG. 4, and as such, only a description of the difference is provided herein.

The structure of the format in FIG. 6 is different from the format in FIG. 5 in that partial information 600 (page inclusion information) is added in association with the tracking information B 500 added to the total hash value 401. In this case, the print data has a registered OID, though its total hash value is different. Hence, all page-specific hash values are compared. If the page-specific hash values of the registered print data completely include the page-specific hash values of the current print data, each page-specific print data is also completely included in the registered print data. It is therefore unnecessary to additionally store the print data. The only information that needs to be added is that representing the printed pages at the time. This is called partial information. The partial information is stored in association with the current tracking information.

Figure 7:
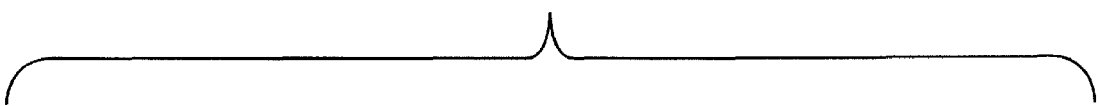
FIG. 7 is a view illustrating examples of the relationship (partial information) between page numbers and hash values according to the first embodiment of the present invention.

FIG. 7 illustrates examples of the relationship (partial information) between page numbers and hash values when page-specific hash values are completely included. The top example illustrates Case III: partial printing. The bottom example illustrates Case IV: updated document printing to be described next.

Figure 8:
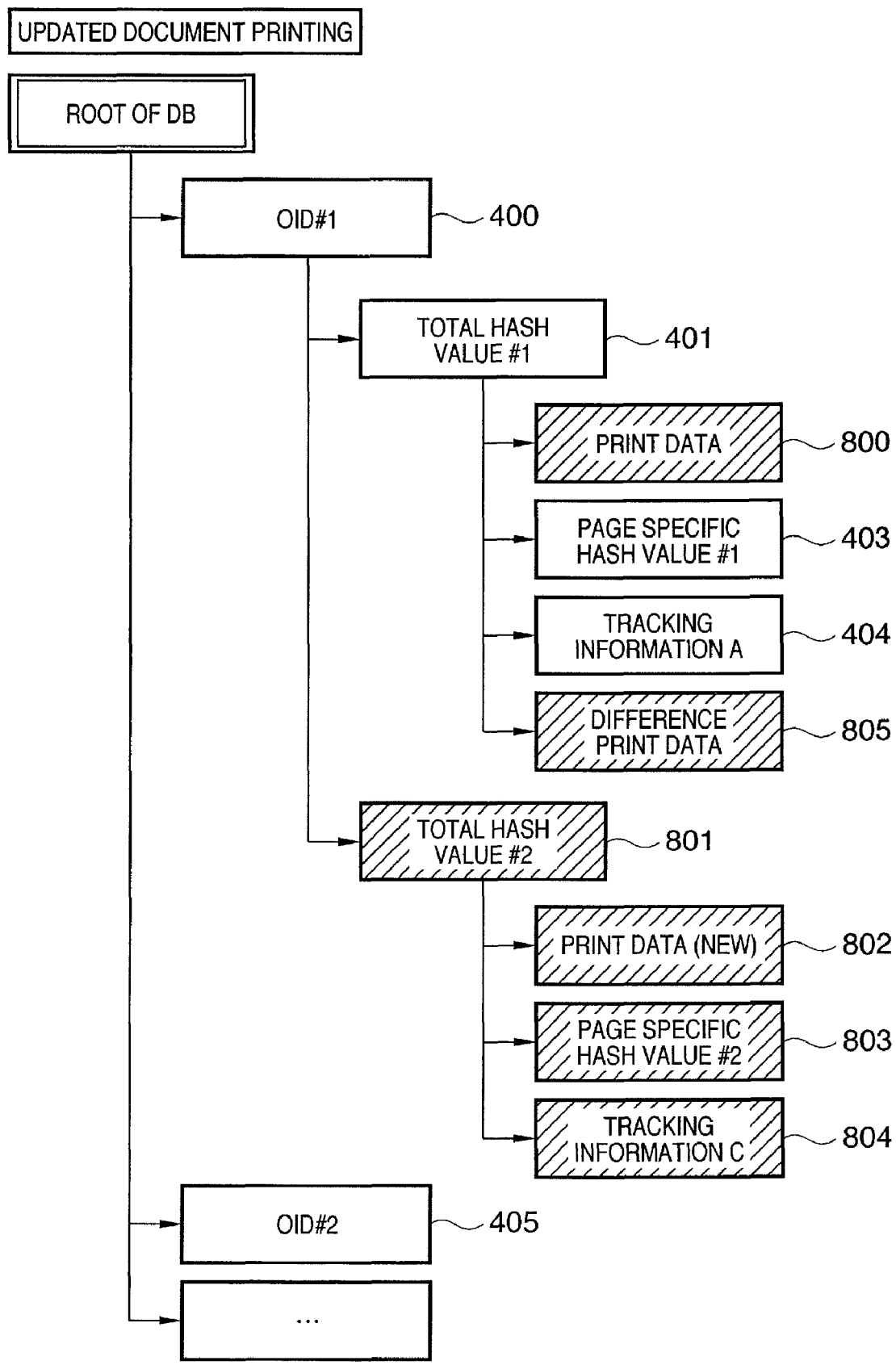
FIG. 8 is a view illustrating a data saving format according to the first embodiment of the present invention.

FIG. 8 illustrates a data saving format in Case IV: updated document printing. The format depicted in FIG. 8 corresponds to printing of an electronic document file located on the file server 100 or the local HDD of the client PC 102, which has been printed in the past and modified from then. Alternatively, it corresponds to printing of a part different from the previously printed part, independent of the presence/absence of modification. In this case, the total hash values do not match, and the page-specific hash values are not included, although the OIDs match. Hence, the situation is determined as Case IV. The format in FIG. 8 is similar to that in FIG. 4, and as such, the same reference numbers are used where appropriate.

FIG. 8 includes a total hash value 801, new print data 802, page-specific hash value group #2 803, and tracking information C 804, which are registered in association with the OID#1 400. Since the new print data 802 will be printed more frequently, holding print data 800 in the present state is an inefficient use of the storage area. To prevent this, the difference between the new print data 802 and the print data 800 is calculated. Only the difference information necessary for reconstructing the print data 800 from the new print data 802 is saved as difference print data 805. Finally, the print data 800 is deleted. If the print data 800 is necessary, it can be reconstructed from the new print data 802 and difference print data 805.

As described above, according to the present embodiment, the identity and similarity of print data is determined based on identification information added to the print data. Based on the determination result, the necessity of print data storage in the server is determined, and the storage data size is reduced accordingly. This allows for effective utilization of the storage resource managed by the server and to efficiently manage significant information.

Second Embodiment

Implementation of the first embodiment can be accomplished by generating the same print data from the same electronic document file. However, a page editor includes a function of imposing logical pages to physical pages on a PC and can therefore generate different print data from one document file.

Figure 9:
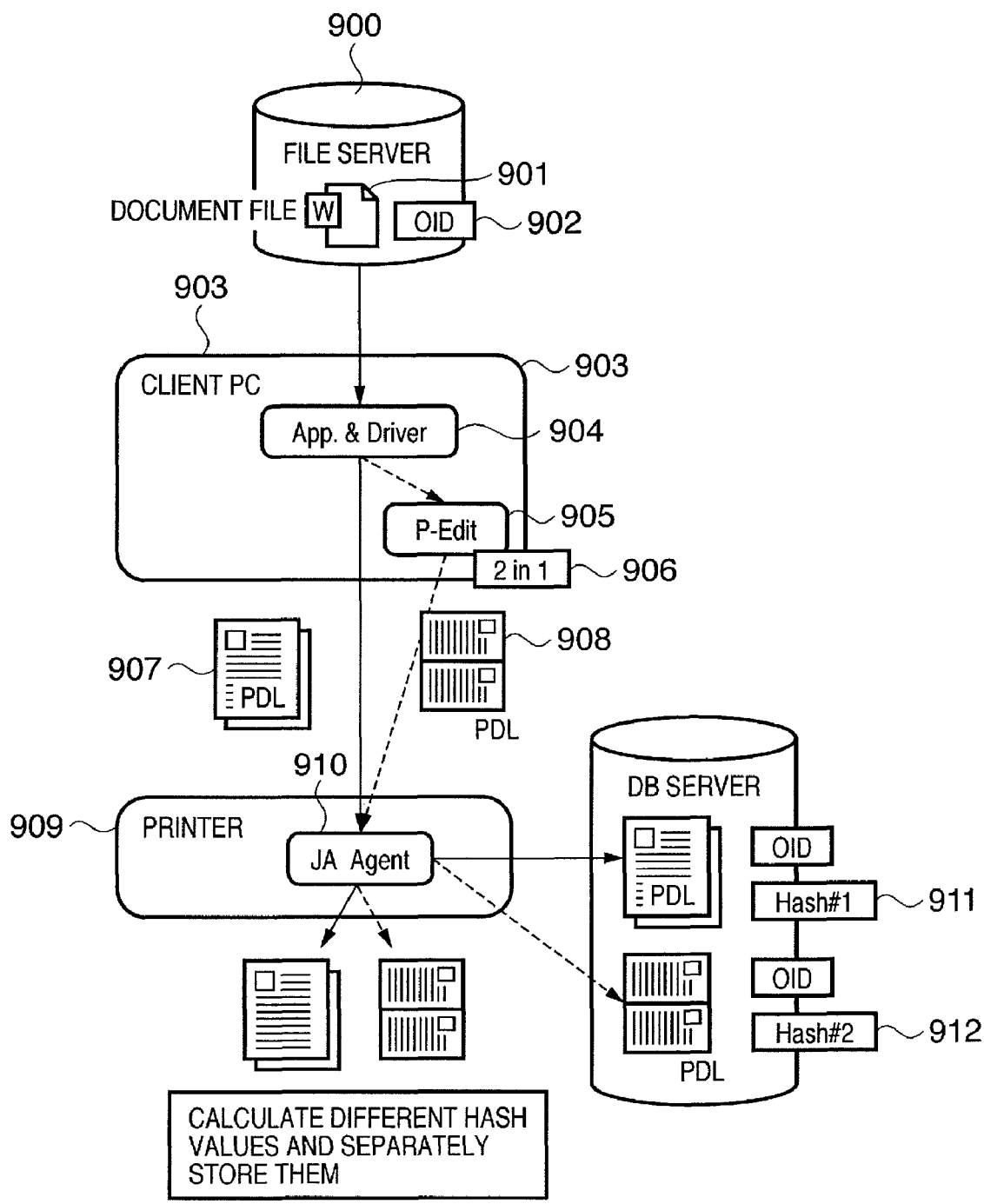
FIG. 9 is a view illustrating the second embodiment of the present invention.

A detailed example will be described with reference to FIG. 9.

A file server 900 employs a file system like NTFS 5 that stores an OID in association with each file. An electronic document file 901 is a confidential document. The name of the folder containing the electronic document file 901 or its access right explicitly indicates the necessity of log record upon printing the confidential document.

Reference numeral 902 denotes an OID of the electronic document file 901. A client PC 903 connects to the file server 900 via a network. If the user has a sufficient access right, the user can browse or print any file on the file server 900.

An application & printer driver 904 capable of interpreting, displaying, editing, and printing the electronic document file 901 translates the contents of the electronic document file 901 into a language interpretable by the printer, e.g., PDL, at the time of printing. A page editor 905 (referred to as a P-Edit hereinafter) has a function of converting, upon printing, the PDL output from the printer driver based on a user instruction.

Reference numeral 906 denotes a print data conversion command that the user inputs to the P-Edit 905. This command indicates "2 in 1". That is, the contents of two pages are reduced to 50% in terms of area ratio and laid out on one page.

Reference numeral 908 represents print data containing two logical pages that are laid out on one physical page by the command 906. Reference numeral 907 indicates comparative print data containing two physical pages without the command 906.

A printer 909 has a function, e.g., Java® platform of analyzing and executing a JVM and can easily expand various functions.

An application, i.e., JA Agent 910 runs on the Java® platform. In addition, JA Agent 910 realizes a part of a function of Job Archive System (JA) using JAVA Application (JVA). The JA Agent 910 implements the process described in the first embodiment for received print data.

If the print data 907 and 908 are received from the client PC, different print data are generated based on print settings, although the two print data have the same OID and unmodified contents. As a result, the total hash values (911, 912) of the print data do not match, and the page-specific hash values are not included, although the OIDs match. In other words as a result of having edited a page by P-Edit 905, a hash value will be different from two pages of print-out matter with print-out matter of 2in1. Hence, the situation is determined as Case IV of the first embodiment. In this case, it is difficult to decrease the storage capacity to manage both print data even if they have the same contents.

The second embodiment implements an arrangement that increases the similarity between storage target print data by changing the operation timing of the P-Edit 905, thereby efficiently saving the storage capacity. The arrangement of the second embodiment formed by adding new functions to the arrangement in FIG. 9 will be described below with reference to FIG. 10.

Figure 10:
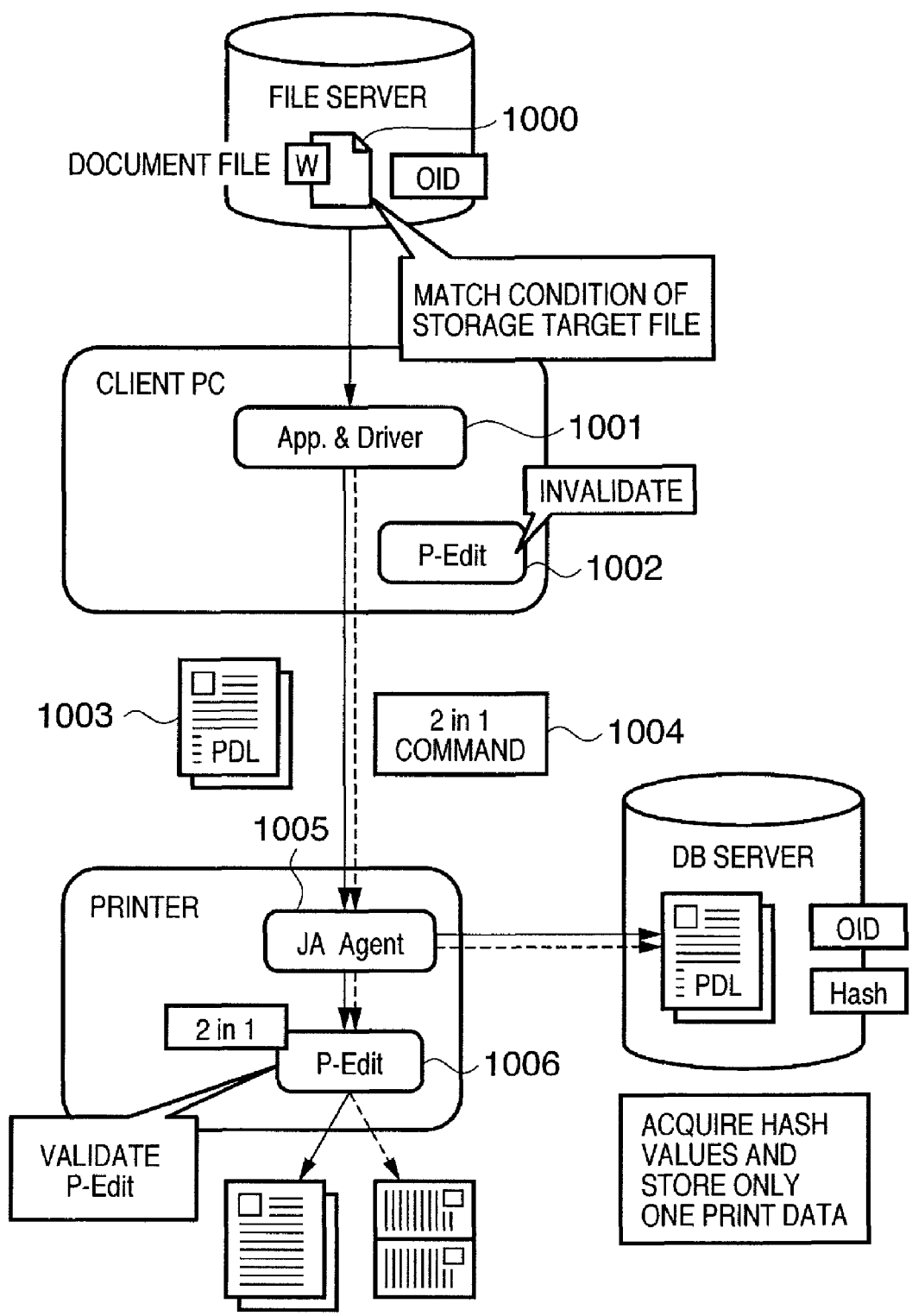
FIG. 10 is a view illustrating the configuration of a print management system according to the second embodiment of the present invention.

FIG. 10 is a view illustrating the configuration of a print management system according to the second embodiment of the present invention.

Reference numeral 1000 denotes an electronic document file. In this organization, all electronic document files whose print logs should be stored are arranged in a folder containing, e.g., a character string "confidential". The electronic document file 1000 is also arranged in this folder.

Reference numeral 1001 denotes an application & printer driver to print the electronic document file. The application & printer driver 1001 has additional functions based on the present embodiment. The application & printer driver 1001 determines, based on a condition such as the attribute of a print target file, whether the print target file is a print log storage target file. If the print target file is determined to be a print log storage target file, a P-Edit 1002 on the client PC is invalidated. The print data and print data conversion command are directly transmitted to a JA Agent 1005. In this case, the print log storage condition set in the printer driver is that the folder having the print target file should contain the character string "confidential".

A command from the printer driver that has received the print log storage target file invalidates, i.e., prohibits process execution, the P-Edit 1002. The P-Edit 1002 typically automatically acquires the print data output from the printer driver to the print spooler and executes the print data conversion process. In this case, however, the process is not executed. Instead, print data 1003 without the print data conversion process is transmitted to the printer. That is, the print data conversion process of a print log storage target file is prohibited independently of whether a print data conversion command such as "2 in 1" is set in the P-Edit 1002 in advance.

Instead, the printer driver transmits the print data 1003 and a corresponding print data conversion command 1004 to the printer. In the conventional arrangement as illustrated in FIG.

9, a P-Edit 905 on the client PC executes the print data conversion process unless the user inputs a special instruction. Hence, a print data conversion command is rarely transmitted to the printer. In the present embodiment, however, a print data conversion command is automatically transmitted to the printer if the print target file is a print log storage target file. In the present embodiment, the printer has the P-Edit 1006 equivalent to that in the client PC to interpret the print data conversion command and implement the print data conversion process.

Upon receiving the print data 1003 and print data conversion command 1004, the printer causes the JA Agent 1005 to execute the process described in the first embodiment. If the print data conversion command is received together with the print data, the JVA Agent 1005 executes the process described in the first embodiment and then validates the P-Edit 1006. The P-Edit 1006 executes the print data conversion process for the print data and actually prints the print data. In this case, the printed product does not change as viewed from the user so that an intended output result can be obtained.

As described above, according to the present embodiment, the storage capacity of the print log storage target file can be saved while satisfying print output intended by the user.

Other Embodiments

The present invention can be applied to an apparatus comprising a single device or to system constituted by a plurality of devices. Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-056940, filed Mar. 2, 2006, which is hereby incorporated by reference herein in its entirety.

What is claimed is:

1. A printing apparatus which prints print data generated based on an electronic file and generates management information about the print data, comprising:

a reception unit configured to receive the print data and identification information associated with the electronic file;

a determination unit configured to determine whether or not the identification information is registered in a management apparatus;

a first comparison unit configured to compare, if the determination unit determined that the identification information is registered in the management apparatus, a first hash value corresponding to the total of received print data received by the reception unit with a second hash value corresponding to the total of registered print data registered in the management apparatus;

a second comparison unit configured to compare, if the result of comparison by the first comparison unit indicates that the first and second hash values do not match, a first set of hash values corresponding to each page of the received print data with a second set of hash values corresponding to each page of the registered print data; and a registration unit configured to generate management information relating to the received print data based on at least one of the result of determination by the determination unit, the result of comparison by the first comparison unit, and the result of comparison by the second comparison unit, and register the generated management information to the management apparatus, wherein if the determination unit determines that the identification information is not registered in the management apparatus, the registration unit generates management information including the received print data, the identification information corresponding to the received print data, the first hash value, the first set of hash values, and tracking information of the received print data, and newly registers the generated management information to the management apparatus, and wherein if the result of comparison by the first comparison unit indicates that the first and second hash values match, or if the result of comparison by the second comparison unit indicates that the second set of hash values completely includes the first set of hash values, the registration unit generates management information including at least tracking information of the received print data, but not including the received print data itself, and registers the generated management information to the management apparatus in association with the identification information.

2. The apparatus according to claim 1, wherein if the result of comparison by the second comparison unit indicates that the second set of hash values completely includes the first set of hash values, the registration unit generates management information including the tracking information and page inclusion information, wherein the page inclusion information indicates that the received print data indicates partial printing of the registered print data, and includes a page number and a hash value corresponding to the page.

3. The apparatus according to claim 1, wherein if the result of comparison by the second comparison unit indicates that the second set of hash values does not completely include the first set of hash values, the registration unit registers the difference between the received print data and the registered print data to the management apparatus in association with identification information.

4. A print management system comprising:
an information processing apparatus;
a printing apparatus,
wherein the information processing apparatus comprises:
a generation unit configured to generate print data based on a designated electronic file; and
a transmission unit configured to transmit, to the printing apparatus, the print data and identification information of the electronic file associated with the print data,
wherein the printing apparatus comprises:
a reception unit configured to receive the print data and the identification information from the information processing apparatus;
a determination unit configured to determine whether or not the identification information is registered in a management apparatus;
a first comparison unit configured to compare, if the determination unit determines that the identification information is registered in the management apparatus, a first hash value corresponding to the total of received print data received by the reception unit with a second hash value corresponding to the total of-registered print data registered in the management apparatus;
a second comparison unit configured to compare, if the result of comparison by the first comparison unit indicates that the first and second hash values do not match, a first set of hash values corresponding to each page of the received print data with a second set of hash values corresponding to each page of the registered print data; and
a registration unit configured to generate management information relating to the received print data based on at least one of the result of determination by the determination unit, the result of comparison by the first comparison unit, and the result of comparison by the second comparison unit, and register, in the management apparatus, the generated management information,
wherein if the determination unit determined that the identification information is not registered in the management apparatus, the registration unit generates management information including the received print data, the identification information corresponding to the received print data, the first hash value, the first set of hash values, and tracking information of the received print data, and newly registers the generated management information to the management apparatus, and
wherein if the result of comparison by the first comparison unit indicates that the first and second hash values match, or if the result of comparison by the second comparison unit indicates that the second set of hash values completely includes the first set of hash values, the registration unit generates management information including at least tracking information of the received print data, but not including the received print data itself, and registers the generated management information to the management apparatus in association with the identification information.

5. A print management system comprising
an information processing apparatus; and
a printing apparatus,
wherein the information processing apparatus comprises:
a generation unit configured to generate print data based on a designated electronic file; and
a transmission unit configured to transmit, to the printing apparatus, the print data and identification information of the electronic file associated with the print data,
wherein the printing apparatus comprises:
a reception unit configured to receive the print data and the identification information associated with the print data from the information processing apparatus;
a determination unit configured to determine whether or not the identification information is registered in a management apparatus;
a first comparison unit configured to compare, if the determination unit determines that the identification information is registered in the management apparatus, a first hash value corresponding to the total of received print data received by the reception unit with a second hash value corresponding to the total of registered print data registered in a management apparatus;
a second comparison unit configured to compare, if the result of comparison by the first comparison unit indicates that the first and second hash values do not match, a first set of hash values corresponding to each page of the received print data with a second set of hash values corresponding to each page of the registered print data; and
a registration unit configured to generate management information relating to the received print data based on at least one of the result of determination by the determination unit, the result of comparison by the first comparison unit, and the result of comparison by the second comparison unit, and register, in the management apparatus, the generated management information,
wherein the registration unit generates difference print data between the registered print data and the received print data, and deletes the registered print data and newly registers the received print data with the management apparatus if comparison by the comparison unit reveals that the identification information is registered in the management apparatus, and part of the registered print data associated with the registered identification information does not completely include the received print data, and wherein, if the deleted registered print data is necessary, the registered print data is reconstructed from the newly registered received print data and the difference print data.

6. A print management system comprising
an information processing apparatus; and
a printing apparatus,
wherein the information processing apparatus comprises:
  a generation unit configured to generate print data based on a designated electronic file;
  a conversion unit configured to convert the print data based on a print data conversion command;
  a prohibition unit configured to prohibit, based on attribute information of the electronic file, the conversion by said conversion unit for the print data; and
  a transmission unit configured to transmit, to the printing apparatus, the print data, and identification information of the electronic file and the print data conversion command which are associated with the print data if the conversion by the conversion unit for the print data is prohibited, and
wherein the printing apparatus comprises:
  a reception unit configured to receive, from the information processing apparatus, the print data, and the identification information of the electronic file and the print data conversion command which are associated with the print data;
  a determination unit configured to determine whether or not the identification information is registered in a management apparatus;
  a first comparison unit configured to compare, if the determination unit determined that the identification information is registered in the management apparatus, a first hash value corresponding to the total of received print data received by the reception unit with a second hash value corresponding to the total of registered print data registered in the management apparatus;
  a second comparison unit configured to compare, if the result of comparison by the first comparison unit indicates that the first and second hash values do not match, a first set of hash values corresponding to each page of the received print data with a second set of hash values corresponding to each page of the registered print data; and
  a registration unit configured to generate management information relating to the received print data based on at least one of the result of determination by the determination unit, the result of comparison by the first comparison unit, and the result of comparison by the second comparison unit, and register, in the management apparatus, the generated management information; and
  a conversion unit configured to convert the print data based on the print data conversion command,
wherein the registration unit generates difference print data between the registered print data and the received print data, and deletes the registered print data and newly registers the received print data with the management apparatus if comparison by the comparison unit reveals that the identification information is registered in the management apparatus, and part of the registered print data associated with the registered identification information does not completely include the received print data, and
wherein, if the deleted registered print data is necessary, the registered print data is reconstructed from the newly registered received print data and the difference print data.

7. A method for controlling a printing apparatus which prints print data generated based on an electronic file and generates management information about the print data, the method comprising:
  receiving the print data and identification information associated with the electronic file;
  determining whether or not the identification information is registered in a management apparatus;
  first comparing, based on if it is determined that the identification information is registered in the management apparatus, a first hash value corresponding to total of received print data received with a second hash value corresponding to the total of registered print data registered in the management apparatus;
  comparing, if the result of comparison by the first comparing step indicates that the first and second hash values do not match, a first set of hash values corresponding to each page of the received print data with a second set of hash values corresponding to each page of the registered print data; and
  registering generated management information relating to the received print data based on at least one of the result of determining the result of the first comparing step, and the result of the second comparing step, in the management apparatus,
wherein if it is determined that the identification information is not registered in the management apparatus, management information is generated including the received print data, the identification information corresponding to the received print data, the first hash value, the first set of hash values, and the tracking information of the received print data, and the generated management information is newly registered to the management apparatus, and
wherein if the result of the first comparing step indicates that the first and second hash values match, or if the result of the second comparing step indicates that the second set of hash values completely includes the first set of hash values, management information is generated including at least tracking information of the received print data, but not including the received print data itself, and the generated management information is registered to the management apparatus in association with the identification information.

8. Computer-executable process steps stored on a non-transitory computer-readable storage medium, the computer-executable process steps causing a computer to execute the method of claim 7.

* * * * *